United States Patent
Tsirkin et al.

(10) Patent No.: US 9,804,873 B2
(45) Date of Patent: Oct. 31, 2017

(54) GUEST MANAGEMENT OF DEVICES ASSIGNED TO A VIRTUAL MACHINE

(71) Applicant: Red Hat Israel, Ltd., Ra'anana (IL)

(72) Inventors: Michael Tsirkin, Ra'anana (IL); Alex Williamson, Fort Collins, CO (US)

(73) Assignee: Red Hat Israel, Ltd., Ra'anana (IL)

( * ) Notice: Subject to any disclaimer, the term of this patent is extended or adjusted under 35 U.S.C. 154(b) by 0 days.

(21) Appl. No.: 14/826,369

(22) Filed: Aug. 14, 2015

(65) Prior Publication Data
US 2017/0046184 A1 Feb. 16, 2017

(51) Int. Cl.
*G06F 9/455* (2006.01)

(52) U.S. Cl.
CPC ...... *G06F 9/45545* (2013.01); *G06F 9/45558* (2013.01); *G06F 2009/45583* (2013.01)

(58) Field of Classification Search
None
See application file for complete search history.

(56) References Cited

U.S. PATENT DOCUMENTS

| | | |
|---|---|---|
| 7,788,665 B2 | 8/2010 | Oshins |
| 7,853,744 B2 | 12/2010 | Mahalingam et al. |
| 7,877,760 B2 | 1/2011 | Oney et al. |
| 7,945,436 B2 | 5/2011 | Ang et al. |
| 8,356,120 B2 | 1/2013 | Tsirkin et al. |
| 8,464,259 B2 | 6/2013 | Belay |
| 8,489,699 B2 | 7/2013 | Goggin et al. |
| 8,533,713 B2 | 9/2013 | Dong |
| 8,924,965 B2 | 12/2014 | Tsirkin et al. |
| 2005/0198633 A1* | 9/2005 | Lantz .................. G06F 9/45558 718/1 |

OTHER PUBLICATIONS

Sanjay Kumar, Karsten Schwan, "Netchannel: A VMM-level Mechanism for Continuous, Transparent Device Access During VM Migration," 10 pages, Mar. 5-7, 2008; Center for Experimental Research in Computer Systems, Georgia Tech; retrieved fromhttp://citeseerx.ist.psu.edu/viewdoc/download?doi=10.1.1.229.2683&rep=rep1&type=pdf on Aug. 12, 2015.
Edwin Zhai, Gregory D. Cummings, Yaozu Dong, "Live Migration with Pass-through Device for Linux VM," 9 pages, Jul. 23-26, 2008; Intel Corp.; retrieved from http://net.pku.edu.cn/vc/read/VM_OLS08.pdf on Aug. 12, 2015.
VMware Workstation 4, "Using the Snapshot," 5 pages, retrieved from https://www.vmware.com/support/ws4/doc/preserve_snapshot_ws.html on Aug. 12, 2015.
VMware VM Live Migration (vMotion), Virtualization, Oct. 14, 2013, pp. 1-7. https://qianr.wordpress.com/2013/10/14/vmware-vm-live-migratin-vmotion/.

* cited by examiner

*Primary Examiner* — Gregory A Kessler
(74) *Attorney, Agent, or Firm* — Haynes and Boone, LLP

(57) ABSTRACT

Systems and methods are disclosed for providing device state information to a destination hypervisor. An example method of providing device state information to a destination hypervisor includes sending, by a source hypervisor to a guest running on a virtual machine, a request to save a state of a device into a memory region that is accessible by the source hypervisor. The device is assigned to the virtual machine. The method also includes providing the content stored at the memory region to a destination hypervisor.

20 Claims, 5 Drawing Sheets

GUEST MANAGEMENT OF DEVICES ASSIGNED TO A VIRTUAL MACHINE

FIELD OF DISCLOSURE

The present disclosure generally relates to virtualization, and more particularly to assigned devices in a virtual environment.

BACKGROUND

A virtual machine (VM) is a portion of software that, when executed on appropriate hardware, creates an environment allowing the virtualization of an actual physical computer system. Each VM may function as a self-contained platform, running its own operating system (OS) and software applications (processes). A host machine (e.g., computer or server) is typically enabled to simultaneously run one or more VMs, where each VM may be used by a local or remote client. The host machine allocates a certain amount of the host's resources to each of the VMs. Each VM may use the allocated resources to execute applications, including OSs known as guests or guest OSs. The hypervisor virtualizes the underlying hardware of the host machine and emulates hardware devices, making the use of the VM transparent to the guest OS or the remote client that uses the VM. Typically, a hypervisor manages allocation and virtualization of computer resources and performs context switching, as may be necessary, to cycle between various VMs.

An emulated device is a virtual device within a VM that mimics a physical hardware device. For emulated devices, a guest sends a request to the hypervisor and the hypervisor interprets the request and executes it on behalf of the guest. With an emulated device, the emulation can run on any physical server, independent of the specifics of the physical device. An emulated device may refer to a device that is implemented by the hypervisor and is exposed to the guest as part of the VM. In an example, the emulated device may be a purely virtual device that mimics real hardware. In such an example, the emulated device may be implemented using full emulation such that the device driver to which the emulated device is assigned may work on the hardware coupled to the host machine. In another example, the emulated device may be a paravirtualized device that is controlled by a device driver that is written for a specific hypervisor. In such an example, the emulated device may be implemented using paravirtualization such that the device driver to which the emulated device is assigned does not work on the hardware coupled to the host machine.

In emulation, no direct requirement exists for virtual and physical devices to be similar, and an access request by the guest can be executed by the hypervisor on behalf of the guest. Accordingly, a migrating VM continues to view the same set of virtual devices across the migration. An emulated device may provide uniformity, with the emulation layer masking any diversity at the level of the physical device. The virtual device may look the same in the source and destination host machines, and the VM may be migrated to another host machine because the guest is using a virtual device that does not need to look like a physical device.

An assigned device is a physical device that is exposed to a guest as part of the VM and may also be known as a pass-through device. An assigned device is also known as a pass-through device because the hypervisor acts as a "pass-through" for communications between the VM and host machine. Device assignment allows the guest running on the VM to have direct access to the assigned device. The hypervisor may assign a device to a VM running on a host machine. The overhead of virtualization is low because a big portion of the functionality for accessing the assigned device is running within the VM. Accordingly, device assignment may result in faster performance compared to the guest accessing an emulated device. Assigning a device to the VM, however, may have some disadvantages. For example, it may be difficult to migrate a VM from one host machine to another because the specificity of a physical device on the physical server becomes exposed to guest software. For assigned devices, a guest sends a request to the hypervisor and the hypervisor passes the request along to a backend device without interpreting the request. It may be difficult to migrate a VM to which a device is assigned because the source hypervisor may not be able to reliably retrieve the state of the assigned device and send the state of the assigned device to the destination hypervisor.

BRIEF SUMMARY

This disclosure relates to providing device state information to a destination hypervisor. Methods, systems, and techniques for providing a state of an assigned device to a destination hypervisor are provided.

According to an embodiment, a method of providing device state information to a destination hypervisor includes sending, by a source hypervisor to a guest running on a virtual machine, a request to save a state of a device into a memory region that is accessible by the source hypervisor. The device is assigned to the virtual machine. The method also includes providing the content stored at the memory region to a destination hypervisor.

According to another embodiment, a system for providing device state information to a destination hypervisor includes a guest that receives a request to save a state of a device into a memory region that is accessible by the source hypervisor and saves the state of the device into the memory region. The device is assigned to the virtual machine. The system also includes the source hypervisor that sends the request to the guest and provides the content stored at the memory region to a destination hypervisor.

According to another embodiment, a non-transitory machine-readable medium includes a plurality of machine-readable instructions that when executed by one or more processors are adapted to cause the one or more processors to perform a method including: sending, by a source hypervisor to a guest running on a virtual machine, a request to save a state of a device into a memory region that is accessible by the source hypervisor, where the device is assigned to the virtual machine; and providing the content stored at the memory region to a destination hypervisor.

BRIEF DESCRIPTION OF THE DRAWINGS

The accompanying drawings, which form a part of the specification, illustrate embodiments of the disclosure and together with the description, further serve to explain the principles of the embodiments. In the drawings, like reference numbers may indicate identical or functionally similar elements. The drawing in which an element first appears is generally indicated by the left-most digit in the corresponding reference number.

Figure 1:
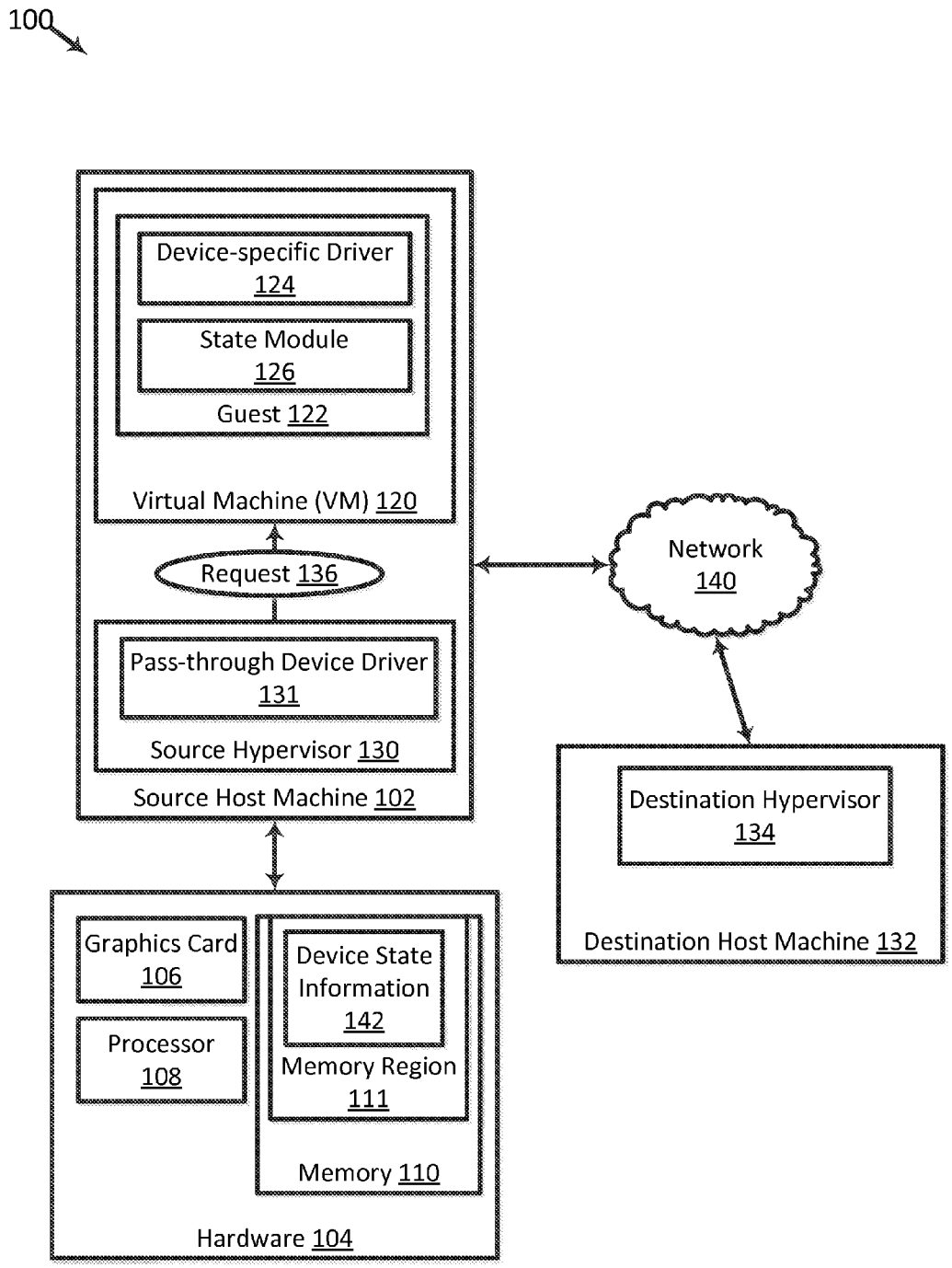
FIG. 1 is a block diagram illustrating a system for providing device state information to a destination hypervisor in accordance with one or more embodiments.

Embodiments of the present disclosure and their advantages are best understood by referring to the detailed description that follows.

DETAILED DESCRIPTION

I. Overview
II. Example System Architecture
III. Example Methods
IV. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

The hypervisor may assign a device to a VM running on a host machine. A device assigned to a VM is associated with a state. To migrate such a VM from a source hypervisor to a destination hypervisor, the source hypervisor may save the state of the device and send the device state information to the destination hypervisor. To perform the migration successfully, the hypervisor may require device-specific code that supports any thinkable device configuration the guest might create. Accordingly, it may be difficult for a hypervisor to support migration for a wide range of assigned devices.

In a virtual environment, some device state information runs through the actual hardware device, and some device state information does not run through the actual hardware device and is instead simulated in the hypervisor. For assigned devices, a guest sends a request to the hypervisor and the hypervisor passes the request along to a backend device without interpreting the request. The hypervisor may pass requests from the guest to the device without understanding the requests and how the device's state is changed based on responding to the requests. Accordingly, the hypervisor may not understand the state of the assigned devices or from where to retrieve this device state information from memory. As such, it may be difficult for a source hypervisor to reliably retrieve the state of a device assigned to a VM and transmit the device state information to a destination hypervisor when the VM is migrated from the source hypervisor to the destination hypervisor.

The present disclosure provides techniques to provide device state information to a destination hypervisor. Unless specifically stated otherwise, as apparent from the following discussion, it is appreciated that throughout the description, discussions utilizing terms such as "determining," "sending," "reading," "receiving," "providing," "executing," "storing," "identifying," "running," "verifying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

FIG. 1 is a block diagram illustrating a system 100 for providing device state information to a destination hypervisor in accordance with one or more embodiments. System 100 includes a source host machine 102 coupled to hardware 104. Hardware 104 includes a graphics card 106, processor 108, memory 110, and may include other I/O devices. A host machine may run one or more VMs that run applications and services. Source host machine 102 includes a VM 120 and a source hypervisor 130. Although one VM is illustrated as running on source host machine 102, other embodiments including more than one VM are within the scope of the present disclosure. The hypervisor may allow multiple operating systems, called guests, to run on the same physical system by offering virtualized hardware to the guest. The host machine may run multiple operating systems, concurrently and in isolation from other programs on a single system. A guest 122 running on VM 120 may be different from the host OS running on source host machine 102. The host OS or guest may include, for example, MICROSOFT® WINDOWS®, LINUX®, SOLARIS®, and MAC® OS. Trademarks are the property of their respective owners.

Source hypervisor 130 may provide guest 122 with access to a device to perform input/output (I/O). The device may be a physical hardware device and may access a host backend that is coupled to source host machine 102. When guest 122 seeks to access the host backend, guest 122 may access the assigned device. A VM may include a guest that executes a device driver that communicates with the hardware devices. In an example, graphics card 106 is assigned to VM 120, and source hypervisor 130 sends one or more communications to guest 122 to cause guest 122 to bind device-specific driver 124 to the assigned device. Guest 122 may execute a device-specific driver 124 that communicates directly with hardware devices without mediation from source hypervisor 130. For example, it may be unnecessary for source hypervisor 130 to interpret requests issued from guest 122 to device-specific driver 124. Rather, source hypervisor 130 may receive requests from guest 122 and pass them along to device-specific driver 124 for processing.

VM 120 includes a state module 126 that manages the state of the devices assigned to VM 120. State module 126 may update and save state information of devices assigned to VM 120 in memory 110 (e.g., virtual memory or a virtual disk). For example, graphics card 106 may be assigned to VM 120, and state module 126 may save the state of graphics card 106 in memory 110. A state of an assigned device may include input data of the device, a power state of the device, data to be processed by the device, etc.

Guest 122 issues requests to devices and knows the results of the requests. Guest 122 includes device-specific driver 124, which may be a device-specific driver that is capable of saving and restoring the state of devices assigned to VM 120. In an example, device-specific driver 124 is specific to graphics card 106, which is assigned to VM 120. In such an example, guest 122 accesses the assigned device using device-specific driver 124. Any guest as part of a VM to which a device is assigned may be capable of controlling the device.

An assigned device has complete access to the memory of the VM to which the device is assigned. The assigned device may be associated with memory regions that are mapped to the VM. The assigned device may make use of memory regions that allow the processor to interact with the device via reads and writes to the memory. The memory regions may be implemented in different ways depending on the architecture and platform (e.g., Memory Mapped I/O (MMIO) or I/O port regions). As such, the memory is accessible to the assigned device.

Source hypervisor 130 includes a pass-through device driver 131. In some embodiments, a host backend that is used by an assigned device is bound to pass-through device driver 131. In such an example, the guest uses the assigned device, and pass-through device driver 131 receives a request from the guest to access the assigned device and forwards the request to the host backend device. It may be unnecessary for source hypervisor 130 or destination hypervisor 134 to have device-specific code. For example, pass-through device driver 131 is not specific to a device and does not provide the functionality of the device. Rather, pass-through device driver 131 receives requests from and passes requests to a particular guest when a device is assigned to a VM running the particular guest.

Source hypervisor 130 may migrate VM 120 to a destination hypervisor 134 running on a destination host machine 132. In an example, source hypervisor 130 may receive a notification that VM 120 is to be migrated from source host machine 102 to destination host machine 132. The migration may be performed for various reasons. For example, destination host machine 132 may have more computing resources available compared to source host machine 102 running VM 120. The source and destination host machines may be coupled over a network 140. The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

To migrate VM 120 to destination hypervisor 134, source hypervisor 130 may send a state of guest 122 and the state of the assigned device to destination hypervisor 134. Although the following may describe the state of one assigned device being saved and restored by guest 122, it should be understood that the more than one device may be assigned to a virtual machine and that a state of more than one assigned device may be saved and restored by a guest and provided to destination hypervisor 134. Source hypervisor 130 may not be in the best position to understand the state of the device assigned to VM 120 because source hypervisor 130 does not interpret the requests from guest 122 to the assigned device. For example, source hypervisor 130 may be unable to reliably retrieve the state of the assigned device. Rather, guest 122 may be in a better position than source hypervisor 130 to understand the state of the devices assigned to VM 120. Rather than maintain and save the state of devices assigned to VM 120, source hypervisor 130 may request that guest 122 do so. To ensure that the state of the assigned device transmitted to destination hypervisor 134 is correct, source hypervisor 130 may send a request 136 to guest 122 to save the state of the device into a memory region 111 that is accessible by source hypervisor 130. In this example, the device is assigned to VM 120.

Guest 122 may receive request 136 and avoid sending further requests to device-specific driver 124 in response to receiving the request. Guest 122 may wait until device-specific driver 124 has processed all of the requests in its queue so that the assigned device (e.g., graphics card 106) is in a consistent state. In response to request 136, guest 122 may instruct device-specific driver 124 to stop the device and save a state of the device assigned to VM 120 into memory region 111. Device state information 142 may include the state of the device assigned to VM 120. Request 136 causes device-specific driver 124 to save the state of the device (e.g., graphics card 106) assigned to VM 120.

In some examples, guest 122 saves device state information 142 in guest memory and provides source hypervisor 130 access to device state information 142. Source hypervisor 130 may already include code for migrating guest memory. Accordingly, it may be unnecessary to write special hypervisor code to migrate the state of the device if device state information 142 is stored in guest memory. In some examples, guest 122 saves device state information 142 in a memory region that is accessible by source hypervisor 130. Source hypervisor 130 may recognize that this memory region stores device state information 142 and provides it to destination hypervisor 134.

In some embodiments, the assigned device is associated with a device identifier that indicates information about the device. A device driver may determine, based on the device identifier, whether the device driver can drive the device. In some examples, the device identifier may indicate the version of the device, model of the device, subsystem identifier of the device, etc. Device state information 142 may include the device identifier.

Guest 122 may send a notification to source hypervisor 130 that device state information 142 has been saved into memory region 111. Device state information 142 may include the state of the devices assigned to VM 120 along with the device identifiers of these devices. Source hypervisor 130 may continue to run VM 120 until the notification from guest 122 is received. In response to receiving the notification that device state information 142 has been saved in memory 110, source hypervisor 130 provides the content stored at memory region 111 to destination hypervisor 134. The content provided to destination hypervisor 134 may include the state of guest 122 along with device state information 142. In some examples, source hypervisor 130 may be unable to understand how the assigned device works, so may be unable to read the state of the device. Using the teachings of the present disclosure, it may be unnecessary for source hypervisor 130 to read and understand the actual state of the device. Rather, source hypervisor 130 may know that memory region 111 stores the state of the device and accordingly provide this content stored at memory region 111 to destination hypervisor 134.

Figure 2:
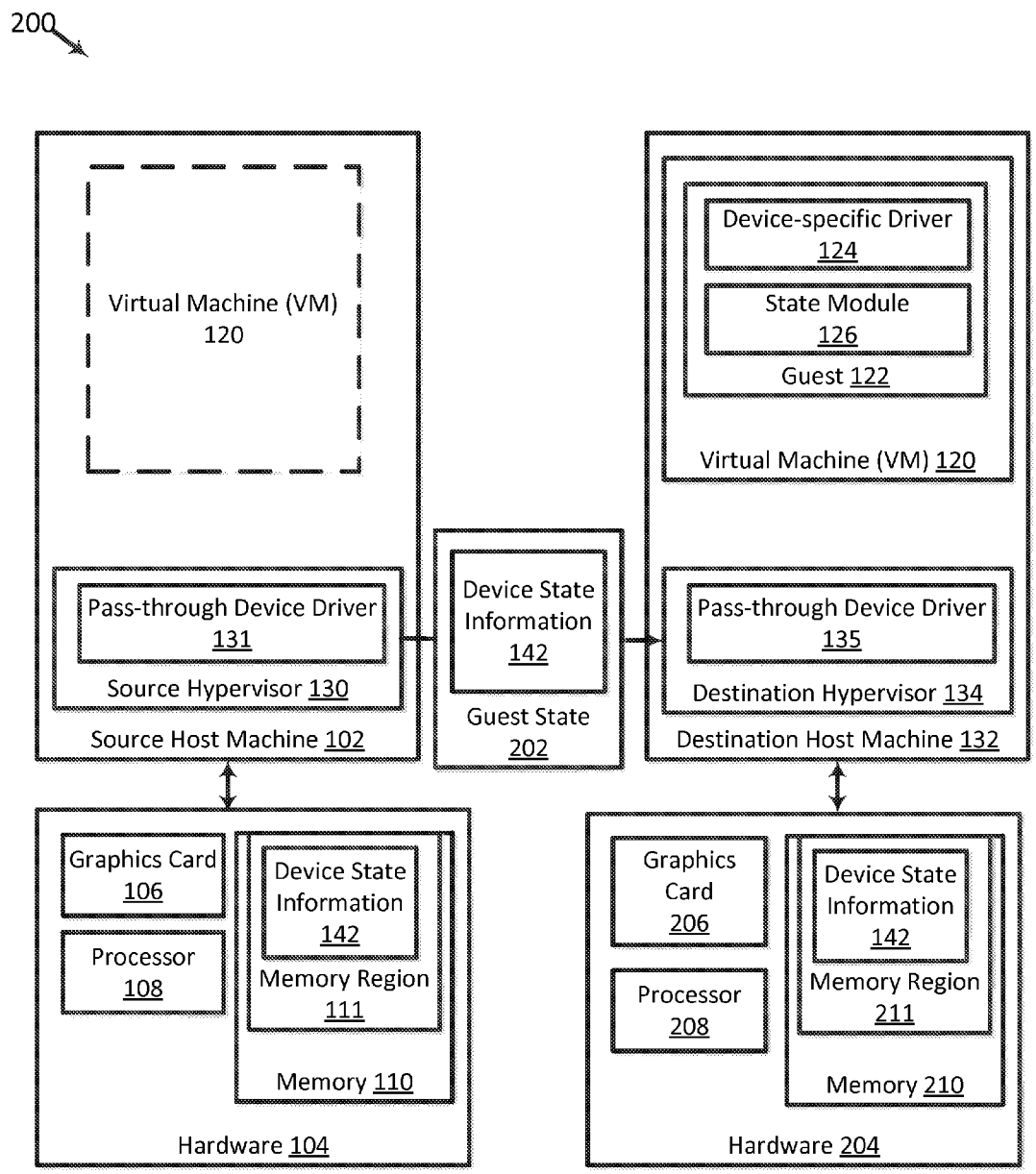
FIG. 2 is another block diagram illustrating a system for providing device state information to a destination hypervisor in accordance with one or more embodiments.

FIG. 2 is another block diagram illustrating a system 200 for providing device state information to a destination hypervisor in accordance with one or more embodiments. In FIG. 2, destination host machine 132 is coupled to hardware 204. Hardware 204 includes a graphics card 206, processor 208, memory 210, and may include other I/O devices. Memory 210 includes a memory region 211.

Source hypervisor 130 may send a guest state 202 to destination hypervisor 134. Guest state 202 includes the state of guest 122 and may also include the content stored at memory region 111, which stores device state information 142. Destination hypervisor 134 may receive guest state 202 and store it in memory region 211, which may be guest memory that is mapped to guest 122 in memory 210. In FIG. 2, VM 120 has migrated from source hypervisor 130 to destination hypervisor 134. VM 120 in source host machine 102 is shown in dashed lines, indicating that VM 120 is no longer running on source hypervisor 130. Rather, destination hypervisor 134 is running VM 120. Device-specific driver 124, running on destination host machine 132, may receive device state information 142 and identify the state of the device assigned to VM 120 along with a device identifier. Destination hypervisor 134 may send a notification to guest 122 to restore the state of the device assigned to VM 120. Guest 122 may retrieve the state of the assigned device from device state information 142. In some examples, guest 122 loads the device state from memory region 211.

In some embodiments, device-specific driver 124 verifies whether the device identified by the device identifier is compatible with device state information 142. For example, device-specific driver 124 may determine, based on the device identifier, that the device assigned to VM 120 is of a specific version. Device-specific driver 124 may analyze device state information 142 and determine to which device version device state information 142 corresponds. If the version of the device identified by the device identifier is compatible with the version of the device to which device state information 142 corresponds, device-specific driver 124 may restore the state of the device assigned to VM 120 from guest memory. In this example, state device state information 142 stored in memory region 111 is the same as that stored in memory region 211. After device-specific driver 124 loads the state of the assigned device, guest 122 may use the device.

Device-specific driver 124 may determine that the device identified by the device identifier is compatible with device state information 142 corresponds even if they correspond to different versions of the device. For example, device identifier may indicate that the device is of version 1 and device state information 142 may correspond to version 2 of the device, but the interface for versions 1 and 2 may be the same. In such an example, device-specific driver 124 may determine that the device identified by the device identifier is compatible with device state information 142.

In contrast, if the device identified by the device identifier is not compatible with device state information 142, device-specific driver 124 may report an error to the user or to destination hypervisor 134. In this example, device-specific driver 124 does not load the state of the device from memory region 211.

In some examples, device-specific driver 124 has support for suspend and resume operations. In response to receiving a suspend operation request, device-specific driver 124 saves the state of the device assigned to VM 120 into a memory region. In response to receiving a resume operation request, device-specific driver 124 restores the state of the device assigned to VM 120 from a memory region. While VM 120 is running on source host machine 102 and before the VM is migrated to destination hypervisor 134, guest 122 may request device-specific driver 124 to invoke the suspend operation in order to save the state of the device assigned to VM 120 in memory region 111. Guest 122 may send device-specific driver 124 a request to invoke the suspend operation in response to receiving request 136. Source hypervisor 130 may provide content stored at memory region 111 to destination hypervisor 134. After VM 120 has been migrated to destination hypervisor 134, guest 122 (now running on destination host machine 132) may request device-specific driver 124 to invoke the resume operation in order to load the state of the device assigned to VM 120 from memory region 211. Guest 122 may send device-specific driver 124 a request to invoke the resume operation in response to, for example, receiving a notification from destination hypervisor 134 to load the state of the device assigned to VM 120.

As discussed above and further emphasized here, FIGS. 1 and 2 are merely examples, which should not unduly limit the scope of the claims.

III. Example Methods

Figure 3:
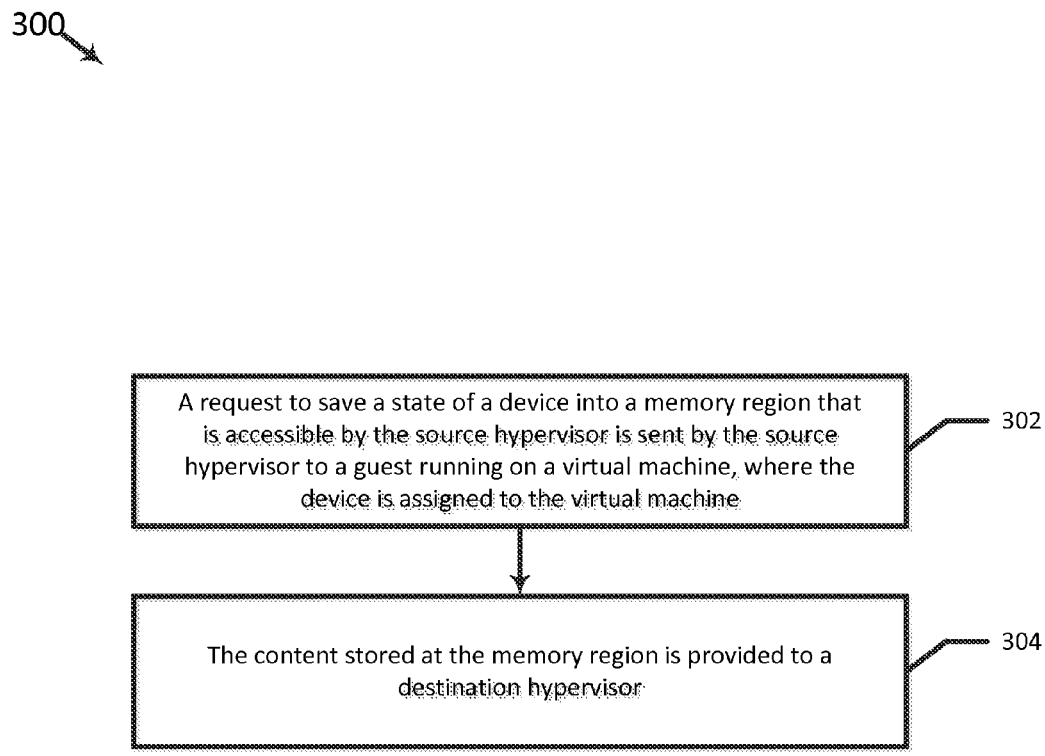
FIG. 3 is a flowchart illustrating a method of providing device state information to a destination hypervisor in accordance with one or more embodiments.

FIG. 3 is a flowchart illustrating a method 300 of providing device state information to a destination hypervisor in accordance with one or more embodiments. Method 300 is not meant to be limiting and may be used in other applications.

Method 300 includes blocks 302 and 304. In a block 302, a request to save a state of a device into a memory region that is accessible by the source hypervisor is sent by the source hypervisor to a guest running on a virtual machine, where the device is assigned to the virtual machine. In an example, source hypervisor 130 sends to guest 122 running on virtual machine 120, request 136 to save a state of a device into memory region 111 that is accessible by the source hypervisor, where the device is assigned to virtual machine 120. In a block 304, the content stored at the memory region is provided to a destination hypervisor. In an example, source hypervisor 130 provides the content stored at memory region 111 to destination hypervisor 134. Source hypervisor 130 may be unable to determine the actual state of the device assigned to VM 120. It may be unnecessary for source hypervisor 130 to do so, however, because source hypervisor 130 may send the content stored at memory region 111 to destination hypervisor 134 without attempting to understand the content.

It is understood that additional processes may be inserted before, during, or after blocks 302 and 304 discussed above. It is also understood that one or more of the blocks of method 300 described herein may be omitted, combined, or performed in a different sequence as desired. In some embodiments, one or more actions illustrated in blocks 302 and 304 may be performed for any number of VM migrations associated with devices assigned to the VMs.

Figure 4:
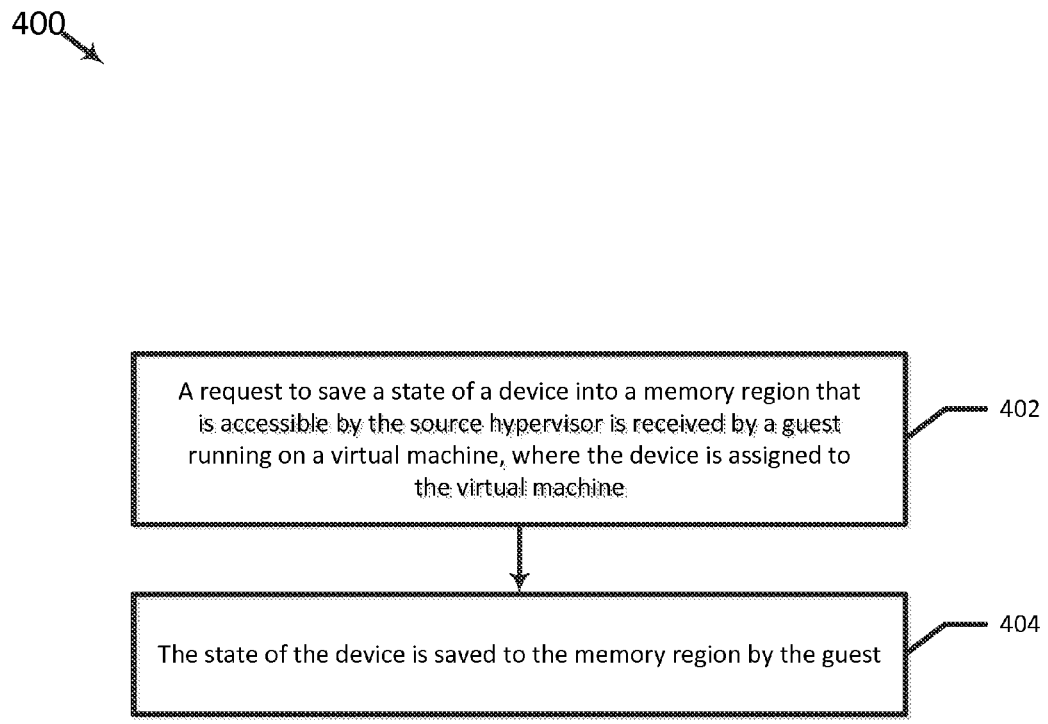
FIG. 4 is another flowchart illustrating a method of providing device state information to a destination hypervisor in accordance with one or more embodiments.

FIG. 4 is another flowchart illustrating a method 400 of providing device state information to a destination hypervisor in accordance with one or more embodiments. Method 400 is not meant to be limiting and may be used in other applications.

Method 400 includes blocks 402 and 404. In a block 402, a request to save a state of a device into a memory region that is accessible by the source hypervisor is received by a guest running on a virtual machine, where the device is assigned to the virtual machine. In an example, guest 122 receives request 136 to save a state of a device into memory region 111 that is accessible by source hypervisor 130, where guest 122 is running on VM 120, and the device is assigned to VM 120. In a block 404, the state of the device is saved to the memory region by the guest. In an example, guest 122 saves the state of the device into memory region 111. In some examples, guest 122 saves the state of the device in guest memory, and source hypervisor 130 migrates the guest memory to destination hypervisor 134. In some examples, guest 122 saves the state of the device in a memory region that is accessible to source hypervisor 130, which provides the state of the assigned device to destination hypervisor 134. After guest 122 is migrated to the destination hypervisor 134, guest 122 may restore the state of the assigned device at destination host machine 132.

It is understood that additional processes may be inserted before, during, or after blocks 402 and 404 discussed above. It is also understood that one or more of the blocks of method 400 described herein may be omitted, combined, or performed in a different sequence as desired. In some embodiments, one or more actions illustrated in blocks 402 and 404 may be performed for any number of VM migrations associated with devices assigned to the VMs.

IV. Example Computing System

Figure 5:
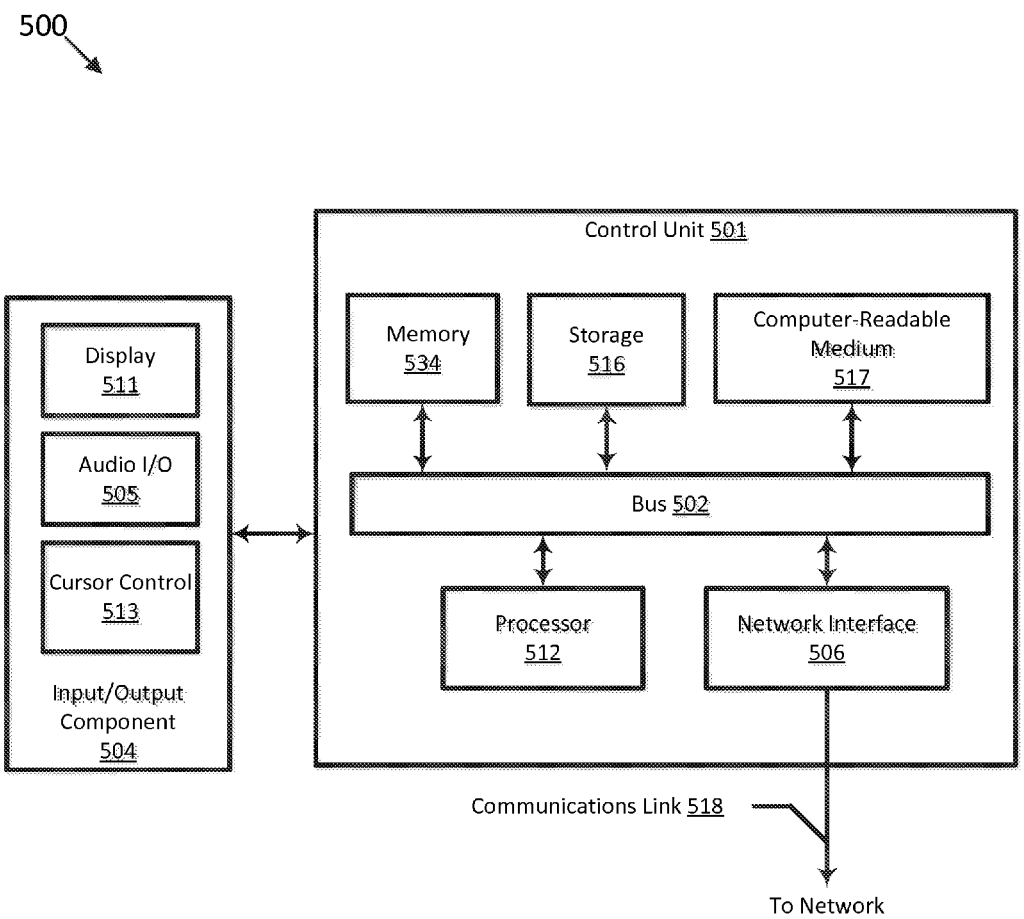
FIG. 5 is a block diagram of an electronic system suitable for implementing one or more embodiments of the present disclosure.

FIG. 5 is a block diagram of a computer system 500 suitable for implementing one or more embodiments of the present disclosure. Each of source hypervisor 130, destination hypervisor 134, and VM 120 may execute on a computing device. The computing device may include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. A processor 512, which may be a micro-controller, digital signal processor (DSP), or other processing component, processes these various signals, such as for display on computer system 500 or transmission to other devices via communications link 518. Components of computer system 500 also include a system memory component 534 (e.g., RAM), a static storage component 516 (e.g., ROM), and/or a computer-readable medium 517. Computer system 500 performs specific operations by processor 512 and other components by executing one or more sequences of instructions contained in system memory component 534.

Components include an input/output (I/O) component 504 that processes a user action, such as selecting keys from a keypad/keyboard, selecting one or more buttons or links, etc., and sends a corresponding signal to bus 502. I/O component 404 may include an output component such as a display 106, and an input control such as a cursor control 513 (such as a keyboard, keypad, mouse, etc.). In some examples, an administrator may provide an input indication to source hypervisor 130 to migrate VM 120 to destination hypervisor 134. An optional audio I/O component 505 may also be included to allow a user to use voice for inputting information by converting audio signals into information signals. Audio I/O component 505 may allow the user to hear audio. A transceiver or network interface 506 transmits and receives signals between computer system 500 and other devices via communications link 518 to a network. In an embodiment, the transmission is wireless, although other transmission mediums and methods may also be suitable.

Logic may be encoded in computer-readable medium 517, which may refer to any medium that participates in providing instructions to processor 512 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 534, and transmission media includes coaxial cables, copper wire, and fiber optics, including wires that include bus 502. In an embodiment, the logic is encoded in non-transitory computer-readable medium. Transmission media may take the form of acoustic or light waves, such as those generated during radio wave, optical, and infrared data communications.

Some common forms of computer-readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read. In various embodiments of the present disclosure, execution of instruction sequences (e.g., method 300 or method 400) to practice the present disclosure may be performed by computer system 500. In various other embodiments of the present disclosure, a plurality of computer systems 500 coupled by communications link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer-readable media. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of providing device state information to a destination hypervisor, comprising:

sending, by a source hypervisor to a guest running on a virtual machine, a request to save a state of a device into a memory region that is accessible by the source hypervisor, wherein the device is assigned to the virtual machine;

receiving, by the source hypervisor, a notification from the guest that the guest has saved the state of the device into the memory region; and providing the content stored at the memory region to a destination hypervisor.

2. The method of claim 1, further comprising:
sending, at the source hypervisor, the content stored at the memory region to the destination hypervisor, wherein sending the content includes providing the state of the device to the destination hypervisor.

3. The method of claim 1, wherein the source hypervisor runs on a first host machine, the method further comprising:
receiving, at the destination hypervisor, the content stored at the memory region;
storing, at the destination hypervisor, the received content into a second memory region of a second host machine, wherein the destination hypervisor runs on the second host machine; and
running, at the destination hypervisor, the guest after receiving the content.

4. The method of claim 3, further comprising:
loading, at the guest running on the destination hypervisor, the device state from the second memory region.

5. The method of claim 1, further comprising:
sending, at the source hypervisor, a device identifier of the device to the destination hypervisor, the identifier indicating a version of the device.

6. The method of claim 1, further comprising:
receiving, at the destination hypervisor, the content stored at the memory region;
receiving, at the destination hypervisor, a device identifier that identifies a second device; and
verifying whether the first device identified by the device identifier is compatible with the second device associated with the received state.

7. The method of claim 1, further comprising:
receiving, at the destination hypervisor, the content stored at the memory region; and
sending, at the destination hypervisor, a notification to the guest to restore the state of the device.

8. The method of claim 1, further comprising:
receiving, at the guest, the request to save the state of the device into the memory region that is accessible by the source hypervisor; and
saving, at the guest, the state of the device.

9. The method of claim 1, further comprising:
migrating the virtual machine to the destination hypervisor, wherein the migrating includes providing the content stored at the memory region to the destination hypervisor.

10. A system for providing device state information to a destination hypervisor, comprising:
a memory region that stores one or more device states;
a guest that receives a request to save a state of a device into the memory region and in response to the request, saves the state of the device into the memory region, wherein the device is assigned to a virtual machine; and
a source hypervisor that has access to the memory region, wherein the source hypervisor sends the request to the guest, receives a notification from the guest that the guest has saved the state of the device into the memory region, and provides the content stored at the memory region to a destination hypervisor.

11. The system of claim 10, wherein the source hypervisor and guest run on a common host machine.

12. The system of claim 10, wherein the source hypervisor migrates the virtual machine to the destination hypervisor.

13. The system of claim 12, wherein after the source hypervisor migrates the virtual machine to the destination hypervisor, the destination hypervisor and guest run on a second common host machine.

14. The system of claim 10, wherein the memory region is in guest memory.

15. The system of claim 10, further comprising:
a destination hypervisor that runs on a destination host machine, receives the content stored at the memory region, and stores the content into a second memory region that is accessible by the guest.

16. The system of claim 15, wherein the guest loads the device state from the second memory region.

17. The system of claim 16, wherein the destination hypervisor sends a notification to the guest to restore the state of the device from the second memory region.

18. A non-transitory machine-readable medium comprising a plurality of machine-readable instructions that when executed by one or more processors are adapted to cause the one or more processors to perform a method comprising:
sending, by a source hypervisor to a guest running on a virtual machine, a request to save a state of a device into a memory region that is accessible by the source hypervisor, wherein the device is assigned to the virtual machine;
receiving, by the source hypervisor, a notification from the guest that the guest has saved the state of the device into the memory region; and
providing the content stored at the memory region to a destination hypervisor.

19. The non-transitory machine-readable medium of claim 18, wherein the plurality of machine-readable instructions are further adapted to cause the one or more processors to perform the method comprising:
receiving, at the guest, the request to save the state of the device into the memory region; and
saving, at the guest, the state of the device into the memory region.

20. The method of claim 1, wherein the memory region is in guest memory.

* * * * *